(12) United States Patent
Tolmunen et al.

(10) Patent No.: US 6,658,235 B1
(45) Date of Patent: Dec. 2, 2003

(54) METHOD FOR TRANSMITTING CONTROL INFORMATION IN A COMMUNICATION SYSTEM

(75) Inventors: Anne Tolmunen, Tampere (FI); Jari Ruohonen, Tampere (FI); Jarkko Oksala, Tampere (FI); Vesa Savela, Tampere (FI)

(73) Assignee: Nokia Mobile Phones Ltd., Espoo (FI)

( * ) Notice: Subject to any disclaimer, the term of this patent is extended or adjusted under 35 U.S.C. 154(b) by 384 days.

(21) Appl. No.: 09/580,752

(22) Filed: May 30, 2000

(30) Foreign Application Priority Data

May 31, 1999 (FI) .................................................. 991235

(51) Int. Cl.$^7$ ............................................. H04B 17/00
(52) U.S. Cl. .................................. 455/67.13; 455/226.1
(58) Field of Search ............................... 455/67.1, 67.3, 455/226.1–226.3, 425, 434, 436, 438; 375/316, 340, 341, 348, 349; 714/759, 791, 794, 795

(56) References Cited

U.S. PATENT DOCUMENTS

| | | | | |
|---|---|---|---|---|
| 4,688,210 A | * | 8/1987 | Eizenhofer et al. | ............ 370/18 |
| 5,453,997 A | * | 9/1995 | Roney, IV | .................. 714/774 |
| 5,513,215 A | * | 4/1996 | Marchetto et al. | .......... 375/233 |
| 5,615,221 A | * | 3/1997 | Karp et al. | ................. 371/37.1 |
| 5,848,106 A | * | 12/1998 | Khayrallah | ................. 375/340 |
| 6,094,421 A | * | 7/2000 | Scott | .......................... 370/280 |
| 6,167,031 A | * | 12/2000 | Olofsson et al. | ............ 370/252 |
| 6,195,337 B1 | * | 2/2001 | Nystrom et al. | ............. 370/252 |
| 6,332,078 B1 | * | 12/2001 | Doi | ............................. 455/434 |
| 6,421,527 B1 | * | 7/2002 | DeMartin et al. | ......... 455/67.13 |

FOREIGN PATENT DOCUMENTS

| | | |
|---|---|---|
| WO | WO 99/12281 | 3/1999 |
| WO | WO 99/12304 | 3/1999 |

OTHER PUBLICATIONS

"Digital Cellular Telecommunications System (Phase 2+); General Packet Radio Service (GPRS); Overall Description Of The GPRS Radio Interface; Stage 2 (GSM 03.64, version 6.1.0, Release 1997)", ETSI Standard Publication TS 101 350 version 6.1.0 (Oct. 1998), section 6.5.4 'Radio Block Structure', p. 20.

"Digital Cellular Telecommunications System (Phase 2+); Channel Coding (GSM 05.03, version 6.2.0, Release 1997)", ETSI Standard Publication Draft EN 300 909, version 6.2.0 Apr. 1999, section 5.1 'Packet Data Traffic Channel (PDTCH)', pp. 26–30.

"Digital Cellular Telecommunications System (Phase 2+); General Packet Radio Service (GPRS); Overall Description of the GPRS Radio Interface; Stage 2 (GSM 03.64, version 6.1.0 Release 1997", section 6.5.5, 'Channel Coding', pp. 20–22.

"Digital Cellular Telecommunications System (Phase 2+); Channel Coding (GSM 05.03, version 6.2.0, Release 1997)", Draft EN 300 909, version 62.0, Apr. 1999, Section 5.1, 'Packet Data Traffic Channel PDTCH)', pp. 26–30.

* cited by examiner

Primary Examiner—Vivian Chin
Assistant Examiner—Tuan Tran
(74) Attorney, Agent, or Firm—Perman & Green, LLP

(57) ABSTRACT

The invention relates to a method and system for transmitting control information in a communication system (1) comprising at least one base station subsystem (BSS) and a wireless terminal (2). In the method and system, a set of alternative values are defined for said control information, and information is transmitted in bursts in packet form between the base station subsystem (BSS) and the wireless terminal (2). At least one burst formed of a packet is supplemented with at least one item of control data, wherein at the receiving state, the control data received in the burst is examined. Also, at least one property of the received signal is examined to find out the reliability of the received control data.

15 Claims, 8 Drawing Sheets

METHOD FOR TRANSMITTING CONTROL INFORMATION IN A COMMUNICATION SYSTEM

The present invention relates to a method for transmitting control information in a communication system comprising at least one base station subsystem and a wireless terminal, in which method a set of alternative values are defined for said control information, information is transmitted in packet form between the base station subsystem and the wireless terminal, the packets to be transmitted on a communication channel are transformed into bursts, and at least one burst formed of a packet is supplemented with at least one item of control data, wherein at the receiving state, the control data received in the burst is examined. The invention also relates to a communication system as set forth in the preamble of claim 8, a wireless terminal as set forth in the preamble of claim 11, as well as a base station subsystem as set forth in the preamble of claim 12.

Figure 1:
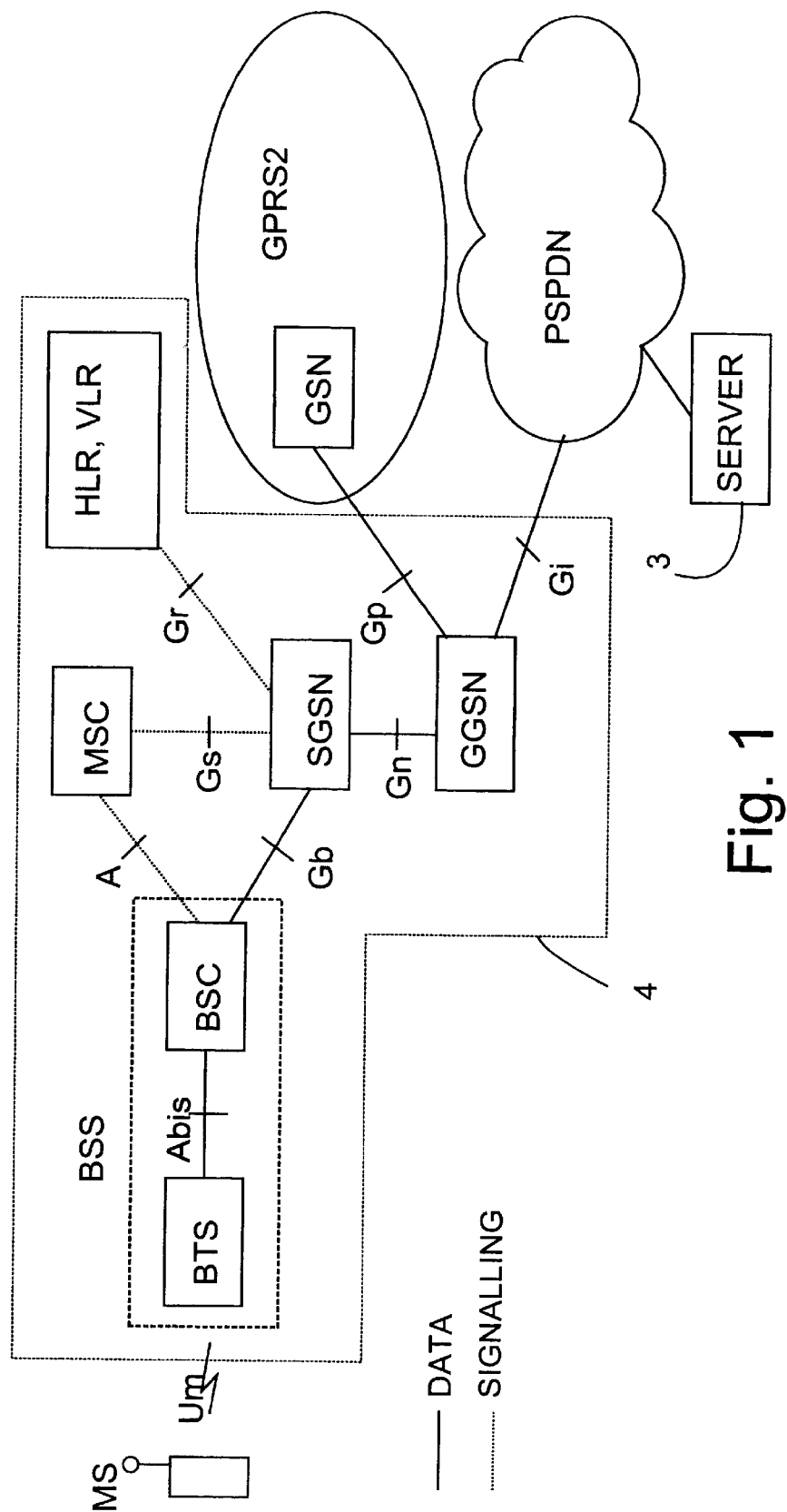

Appended FIG. 1 shows a communication system implementing packet-format data transmission. This example system is a so-called GPRS packet network (General Packet Radio Service). The system consists of mobile stations MS which communicate with base transceiver stations BTS by means of an air interface (radio interface) Um. The base transceiver stations are controlled by base station controllers BSC which communicate with a mobile switching centre MSC. The base station controller BSC and the base transceiver stations BTS coupled therewith are also jointly called a base station subsystem BSS. The connection interface between the mobile switching centre MSC and the base station subsystem BSS is called an A interface. Correspondingly, the interface between the base station controller BSC and the base transceiver station BTS is called an Abis interface. The mobile switching centre MSC takes care of e.g. controlling incoming and outgoing calls like a centre for a public switched telephone network (PSTN) (not shown). Furthermore, the mobile switching centre MSC takes care of performing the operations required in mobile communication, such as controlling the location of the mobile station e.g. by means of a home location register HLR and a visitor location register VLR.

In digital mobile communication systems, the radio connection has typically been a so-called circuit-switched connection, which means that the resources allocated for each mobile station for a call are reserved for the whole time of the connection solely for this mobile station. The general packet radio service GPRS is a new service designed for digital mobile communication systems. This general packet radio service GPRS is designed particularly for GSM systems. A corresponding packet radio service in the North American D-AMPS system is called CDPD.

The general packet radio service GPRS is a new service under development in the GSM mobile communication system. The appended FIG. 1 shows connections of a telecommunication network in a packet-switched GPRS service. The main element for GPRS services in the network infrastructure is a GPRS support node, so-called GSN. It is a mobility router which implements the coupling and cooperation between different data networks, e.g. to a public switched packet data network PSPDN via connection Gi or to a GPRS network of another operator via a connection Gp, mobility management with the GPRS registers via a connection Gr, and the transmission of data packets to wireless communication devices MS irrespective or their location. Physically, the GPRS support node GSN can be integrated with the mobile switching centre MSC, or it can be a separate network element based on the architecture of the data network routers. The user data is passed via a connection Gb directly between the support node GSN and the base station subsystem BSS consisting of base transceiver stations BTS and the base station controller BSC, but between the support node GSN and the mobile switching centre MSC there is a signalling connection Gs. In FIG. 1, continuous lines between the blocks illustrate data traffic (i.e. the transfer of speech and/or data in digital format) and broken lines illustrate signalling. Physically, the data can be passed transparently via the mobile switching centre MSC. The reference Gn represents a connection between different support nodes of the same operator. The support nodes are normally divided into gateway support nodes GGSN (Gateway GSN) and serving support nodes SGSN (Serving GSN), as shown in FIG. 1.

Consequently, the GPRS service makes it possible to transmit information in packet form between a wireless communication device and an external data network, wherein certain parts of the mobile communication network constitute an access network.

Figure 2:
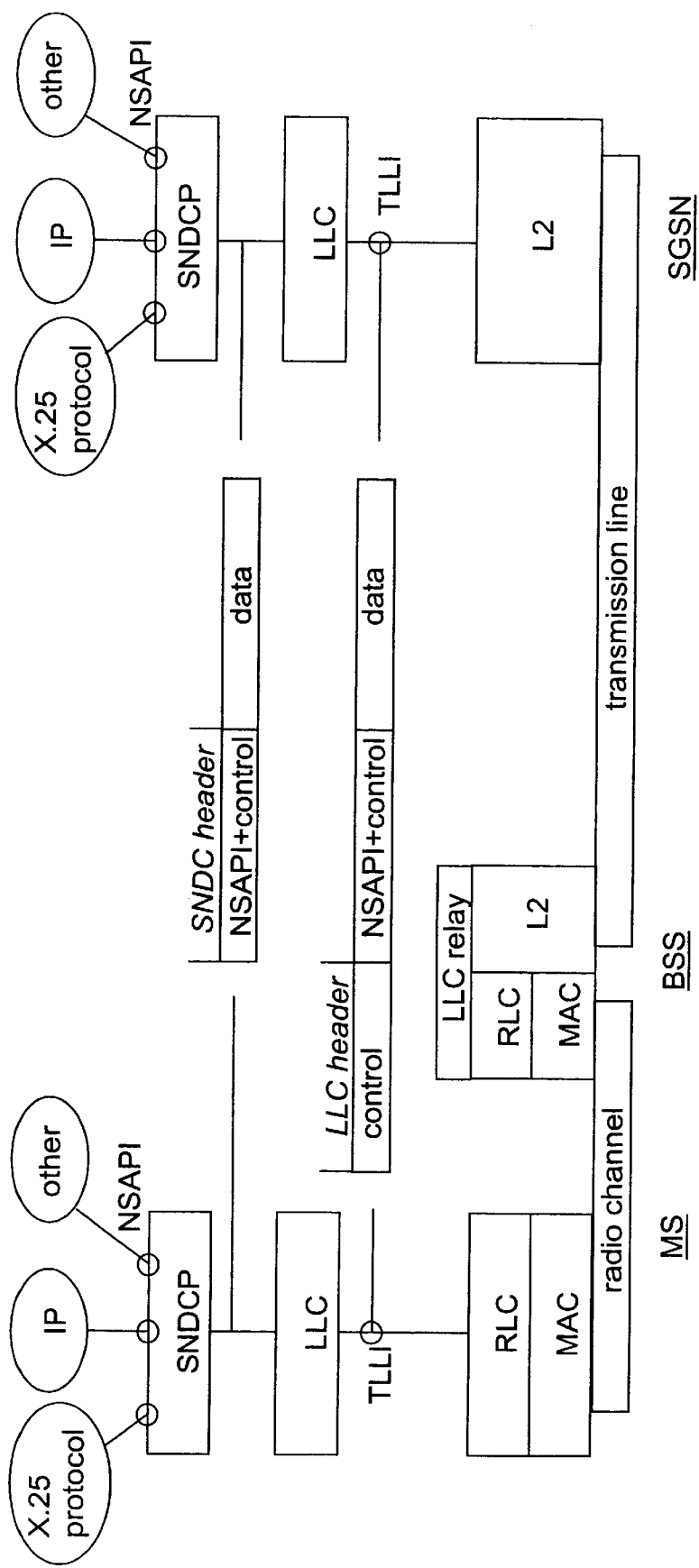

The function of the wireless communication device MS and the support node SGSN can be divided into several layers, each of which have a different function, as shown in FIG. 2. Transmission of data, such as control signalling and the transmission of data transmitted and received by a user, between the wireless communication device MS and the support node SGSN takes place preferably in the form of data frames. The data frame of each layer consists of a header and a data field.

Information contained in a data field can be e.g. information entered by the user of the wireless communication device or signalling data. The following is a description on the functions of the layers in the GPRS system.

In the link layer, the lowermost layer is the MAC layer (Media Access Control) which takes care of the use of the radio channel in communication between the wireless communication device MS and the base station subsystem BSS, such as channel allocation in the transmission and reception of packets.

In the lowermost layer, data transmission between the base station subsystem BSS and the support node SGSN takes place in the L2 layer (link layer) applying a link layer protocol, such as the LAPD protocol, frame relay protocol, or the like, The L2 layer can also contain quality or routing data according to the GPRS specifications. The L2 layer has properties of the physical layer and the link layer according to the OSI model.

Above the MAC layer there is the RLC layer (Radio Link Control) which serves the functions of dividing the data frames of the link layer formed by the LLC layer into packets of the radio connection (PDU, Protocol Data Unit) having a determined size to be transmitted on the radio channel, transmitting the packets, and retransmitting them, if necessary. In the GPRS system, the length of the packets is the length of one GSM time slot (ca. 0.577 ms). In the GPRS system, the packet structure of the radio connection to be applied at the time of the invention is presented more closely in the ETSI standard publication TS 101 350 v6.1.0 (1998-10): "Digital cellular telecommunications system (Phase 2+); General Packet Radio Service (GPRS); Overall description of the GPRS radio interface; Stage 2 (GSM 03.64 version 6.1.0 Release 1997)", section 6.5.4 "Radio Block Structure", p. 20.

The LLC layer (Logical Link Control) offers a reliable communication link between the wireless communication device MS and the support node SGSN. For example, the LLC layer supplements the message to be transmitted with error checking data, whereby attempts can be made to correct incorrectly received messages and, if necessary, the message can be retransmitted. Furthermore, data encryption and decryption takes place in the LLC layer.

The SNDCP layer (Sub-Network Dependent Convergence Protocol) is used for performing the protocol changes, compression, segmenting of the information to be transmitted, and the segmenting of messages coming from an upper layer. The SNDCP frame comprises preferably an SNDCP header and a SNDCP data field. The SNDCP header consists of protocol information (Network Service Access Point Identity, NSAPI) and SNDCP control data, such as the compressing, segmenting and encryption definitions. The SNDCP layer is used as a protocol adapter between protocols used in an upper layer (IP/X.25) and the LLC layer (link layer).

The information to be transmitted comes to the SNDCP layer preferably as data packets complying with a protocol (PDP, Packet Data Protocol) from another application, such as messages according to the X.25 protocol or packets according to the Internet protocol (IP). The application can be e.g. a data application of the wireless communication device, a telecopy application, a computer program communicating with the wireless communication device, etc.

The SNDCP frame is transferred to the LLC layer, in which the frame is supplemented with an LLC header. The LLC header comprises e.g. an LLC control part which determines the frame number and the command type (info, acknowledgement, retransmission request, etc). In connection with logging in the GPRS packet network, the wireless communication device transmits a login request message to the support node SGSN. The support node SGSN can, on the basis of the international mobile station identity (IMSI) of the wireless communication device, retrieve information from the home location register HLR corresponding to the wireless communication device in question, wherein the support node SGSN can, using this information, select a temporary logical link identity (TLLI) for the data transmission connection. If the wireless communication device has previously been allocated a TLLI identity, the wireless communication device transmits this in the request message, wherein the support node SGSN can allocate this identity again for the wireless communication device, or allocate a new TLLI identity. The support node SGSN transmits the TLLI identity selected by the same to the wireless communication device, for use in the data transmission connection between the wireless communication device and the support node SGSN. This TLLI identity is used in the communication to determine the data transmission connection to which each message belongs. The same TLLI identity must not be used in more than one data transmission connection simultaneously. After the connection has been terminated, the TLLI identity used in the connection can be allocated for a new connection to be set up.

The cells of the packet network are divided into routing areas in such a way that each routing area comprises several cells. Thus, the mobility management functions of the wireless communication device are used to maintain information on the location and connection status of wireless communication devices in the operation range of the packet network. This information is maintained both in the wireless communication device and in the packet network, preferably in the GPRS support node SGSN.

To use GPRS services, the wireless communication device first performs logging in the network (GPRS attach), whereby the wireless communication device reports that it is ready for packet data transmission. The login makes a logical link between the wireless communication device and the support node SGSN, making it possible to transmit short message services (SMS) via the GPRS network, paging services via the support node, and informing about incoming packet data to the wireless communication device. In connection with logging in of the wireless communication device, the support node also performs mobility management (MM) and user identification. To transmit and receive data, the packet data protocol (PDP) is activated, whereby the wireless communication device is allocated a packet data address to be used in the packet data connection, wherein the address of the wireless communication device is known in a gateway support node. Consequently, upon the logging in, a data transmission connection is set up to the wireless communication device, to the support node and to the gateway support node, the connection being allocated a protocol (for example X.25 or IP), a connection address (e.g. X.121 address), quality of service, and a network service access point identifier (NSAPI). The wireless communication device activates the packet data connection by an activate PDP context request, in which the wireless communication device gives the temporary logical link identity (TLLI), the packet data connection type, the address, the required quality of service, the network service access point identifier, and possibly also an access point name (APN).

The GSM system is a time division multiple access (TDMA) system, in which traffic on the radio channel is time divided, taking place in repeated TDMA frames, each consisting of several (eight) time slots. In each time slot, an information packet is transmitted in a radio-frequency burst of a definite duration and consisting of a group of modulated bits. The time slots are primarily used as control channels and traffic channels. The traffic channels are used for the transmission of speech and data, and the control channels are used for signalling between a base transceiver station BTS and wireless communication devices MS1. One packet of a radio connection is transmitted in four bursts.

In comparison with a circuit-switched connection, packet data transmission offers e.g. the advantage that resources are allocated for the connection only according to the need, wherein resources can be deallocated for other connections when there is a connection with no need for data transmission. In packet data transmission, the information to be transmitted, such as speech or data, is divided into packets. After a packet has been transmitted via the air interface Um and it the transmitter has no further packet to be transmitted at the moment, the radio resource can be deallocated for the use of other connections. Such packet data transmission is particularly suitable for the use of data services.

The information to be transmitted in the packet connection is transferred from the application layer to the link layer, in which the information is converted into packets of the link layer. For example in the GPRS system, these packets of the link layer intended for data transmission comprise an MAC header, an RLC header and a data field. For encoding the packets, four channel encoding schemes are defined: CS-1, CS-2, CS-3 and CS-4. Each of the channel encoding schemes has certain encoding parameters which are presented in the appended table 1. For example the first channel encoding scheme CS-1 uses the code ratio 1/2 without puncturing. The data transmission rate at this encoding scheme is 9.05 kbit/s in the GPRS system. In a corresponding manner, using the fourth channel encoding scheme CS-4, it is possible to achieve the greatest data transmission rate at the moment, ca. 21.4 kbit/s. The data transmission rate can be increased even further e.g. by allocating several time slots for the connection. The channel encoding scheme used at the time is indicated with so-called stealing flag bits in connection with the bursts. Thus, the receiving device can use these stealing flags to examine, which decoding method should be selected for the reception of the packet. In the GPRS system, the number of stealing flag bits is 8, and 2 of these bits are transmitted in each burst. These bits are added into the bursts at the transmission stage, as will be described below in this specification.

wherein 8 mobile stations can share the same time slot. Each mobile station is allocated its own uplink state flag (USF). For this reason it is very important that the mobile stations can decode this uplink state flag correctly so that no mobile station transmits in bursts allocated for another mobile station. Said 8 uplink state flags (USF) in the GPRS system are selected in such a way that the bit pattern to be transmitted is the same, irrespective of channel coding. In this way, the uplink state flag to be transmitted with the

TABLE 1

| Encoding method | Encoding ratio | USF | Pre-coded USF | Block length (not USF, BCS) | BCS | Tail bits | Number of bits encoded | Bits to be removed | Data transmission rate kb/s |
|---|---|---|---|---|---|---|---|---|---|
| CS-1 | 1/2 | 3 | 3 | 181 | 40 | 4 | 456 | 0 | 9.05 |
| CS-2 | ≈2/3 | 3 | 6 | 268 | 16 | 4 | 588 | 132 | 13.4 |
| CS-3 | ≈3/4 | 3 | 6 | 312 | 16 | 4 | 676 | 220 | 15.6 |
| CS-4 | 1 | 3 | 12 | 428 | 16 | — | 456 | 0 | 21.4 |

In the GPRS system, the channel encoding schemes are given by means of the following bit strings:

bit no: 1234 5678
CS-1: 1111 1111
CS-2: 1100 1000
CS-3: 0010 0001
CS-4: 0001 0110

These bits are transmitted in the order from the left to the right in four bursts in such a way that in the first burst the first and second bits from the left are transmitted, in the second burst the third and fourth bits are transmitted, in the third burst the fifth and sixth bits are transmitted, and in the fourth burst the seventh and eighth bits are transmitted. This data transmission giving the channel encoding scheme according to the GPRS system is presented in the ETSI standard publication Draft EN 300 909 v6.2.0 (1999-04): "Digital cellular telecommunications system (Phase 2+); Channel coding (GSM 05.03 version 6.2.0 Release 1997)", section 5.1 "Packet data traffic channel (PDTCH)", pages 26–30.

The channel encoding schemes applied in the GPRS system at the time of the invention are presented more closely in the above-mentioned ETSI standard publications TS 101 350 v6.1.0 (1998-10): "Digital cellular telecommunications system (Phase 2+); General Packet Radio Service (GPRS); Overall description of the GPRS radio interface; Stage 2 (GSM 03.64 version 6.1.0 Release 1997)", section 6.5.5 "Channel coding" pages 20–22, and Draft EN 300 909 v6.2.0 (1999-04): "Digital cellular telecommunications system (Phase 2+); Channel coding (GSM 05.03 version 6.2.0 Release 1997)", section 5.1 "Packet data traffic channel (PDTCH)", pages 26–30.

The decoder compares the bit pattern formed by the bits received by the decoder into these four schemes and preferably selects the one in which the bit patterns correspond to each other as closely as possible (Nearest Neighbour). One method for performing the comparison is the method of Euclidean distance. Also cross-correlation or Hamming distance can be used to find out the closest scheme.

In the bursts transmitted from the base stations is also transmitted information on the mobile station which is allowed to transmit in the next bursts allocated for transmission of a packet of the link layer. In the GPRS system, eight different values are used to transmit this information, encoded packet on the radio channel is one of the following, presented in such a way that the least significant bit is on the left:

| R1: | 000 000 000 000 |
|---|---|
| R2: | 000 011 011 101 |
| R3: | 001 101 110 110 |
| R4: | 001 110 101 011 |
| R5: | 110 100 001 011 |
| R6: | 110 111 010 110 |
| R7: | 111 001 111 101 |
| R8: | 111 010 100 000. |

By using these received bits of the uplink state flag, the receiving mobile station performs a deduction, whether the next burst string on the transmission channel is intended for use by the mobile station or not. Also in this comparison it is possible to use said method of Euclidean distance.

To form the bursts from the packets of the link layer, the following steps are preferably taken at the transmission stage. The packet is supplemented with a block check sequence (BCS), which is used to find out possible transfer errors at the receiving stage. Next, the uplink state flag is added to the packet, and channel encoding is performed with any of said channel encoding schemes. If the first channel encoding scheme CS-1 is used, the uplink state flag is added in the MAC header of the packet. With the second CS-2 and third channel encoding schemes CS-3, the uplink state flag is pre-coded, wherein a 6-bit digit is formed, which becomes a 12-bit digit in the channel encoding. In the case of the fourth channel encoding scheme, a 3-bit digit is converted directly e.g. by means of the above-presented table into a 12-bit digit which is added into the packet. Using the first CS-1, second CS-2 or third channel encoding scheme CS-3, the packet is supplemented with a sufficient number of tail bits (in this example 4 bits), after which the packet is subjected to error correction coding by a convolution code using the bit ratio 1/2. After this, if necessary, some of the encoded bits are eliminated (punctured) before modulation to form a burst of a given length. This puncturing is made in the GPRS system when either the second channel encoding scheme CS-2 or the third channel encoding scheme CS-3 is used.

Radio communication is subject to interference, and the mobility of the wireless terminals may cause variations in the signal strength. Thus, the receiving device is not necessarily capable of receiving these stealing flag bits correctly, which may lead to a misinterpretation. Thus the decoder of the receiving device will use an incorrect decoding method in the reception of the packet. Also the bits of the uplink state flag can be received incorrectly, which may cause that the wireless terminal will transmit at a time allocated for another wireless terminal.

It is an aim of the present invention to achieve a communication system for packet data transmission and a method for finding out the channel encoding data and/or the uplink state flag in a reliable way in this communication system. The invention is based on the idea that in addition to finding out the received channel encoding data and the uplink state flag, the strength of the received signal and the signal/noise ratio are measured at the receiving stage, wherein these measurements are used to evaluate if the reception was sufficiently reliable and if the detected control information value, such as channel encoding data and/or the uplink state flag, can be used. The method according to the present invention is primarily characterized in that the method also comprises the step of examining at least one property of the received signal to find out the reliability of the received control data. The communication system according to the present invention is primarily characterized in that the communication system also comprises means for examining at least one property of the received signal to find out the reliability of the received control data. The wireless terminal according to the present invention is primarily characterized in that the wireless terminal also comprises means for examining at least one property of the received signal to find out the reliability of the received control data. Furthermore, the base station subsystem according to the present invention is characterized in that the base station subsystem also comprises means for examining at least one property of the received signal to find out the reliability of the received control data.

The present invention leads to significant advantages. Using the method of the invention, it is possible to improve the reliability of information received in the receiving device particularly in situations in which radio transmission is subject to interference. Thus, it is possible to reduce the probability of the fact that the receiving device selects an incorrect decoding method. Also the probability that the wireless terminal tries to transmit at a time allocated for another wireless terminal is reduced by applying the method of the invention, particularly in situations in which the signal strength and/or the signal/noise ratio is small.

Figure 3A:
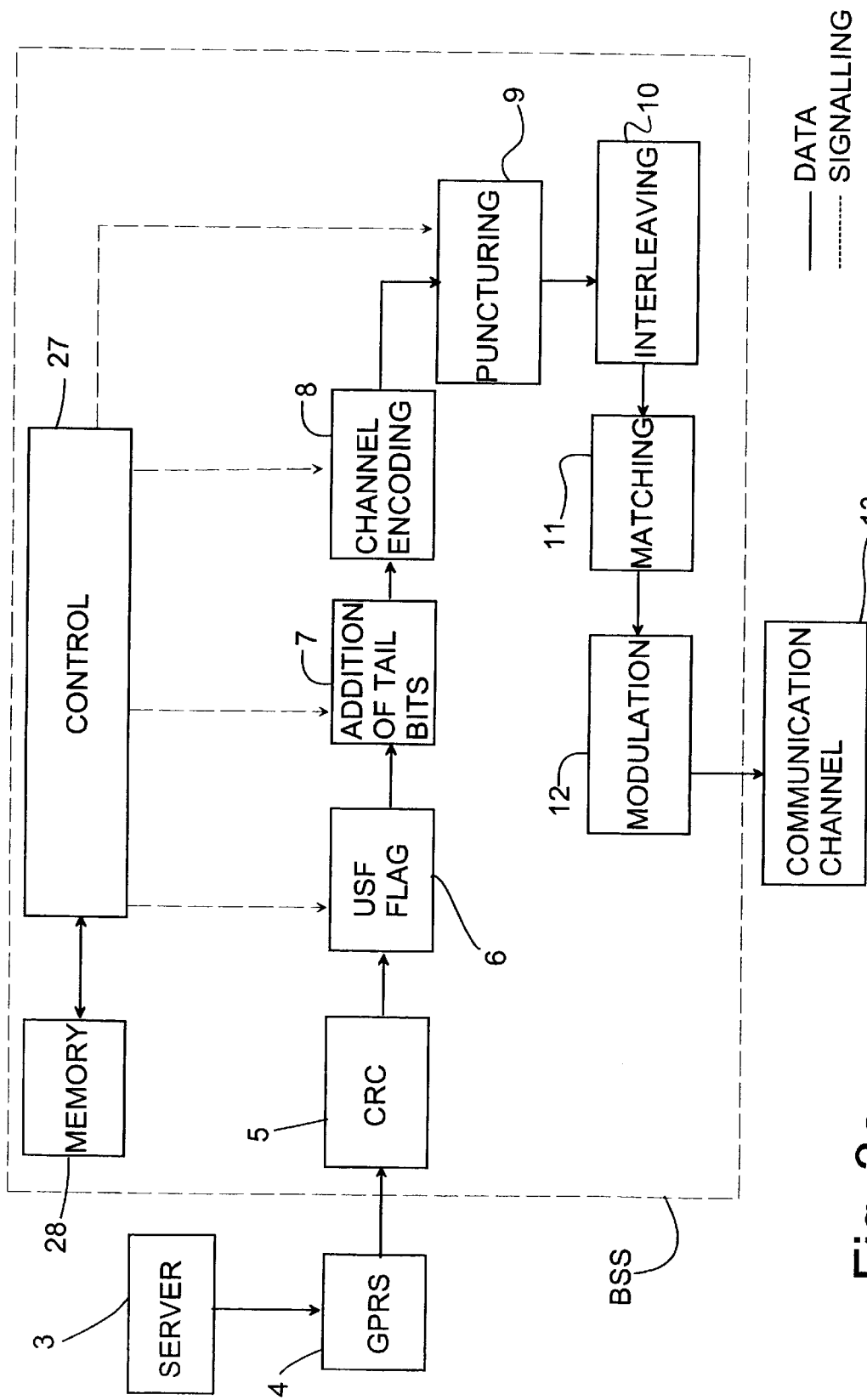
Figure 3B:
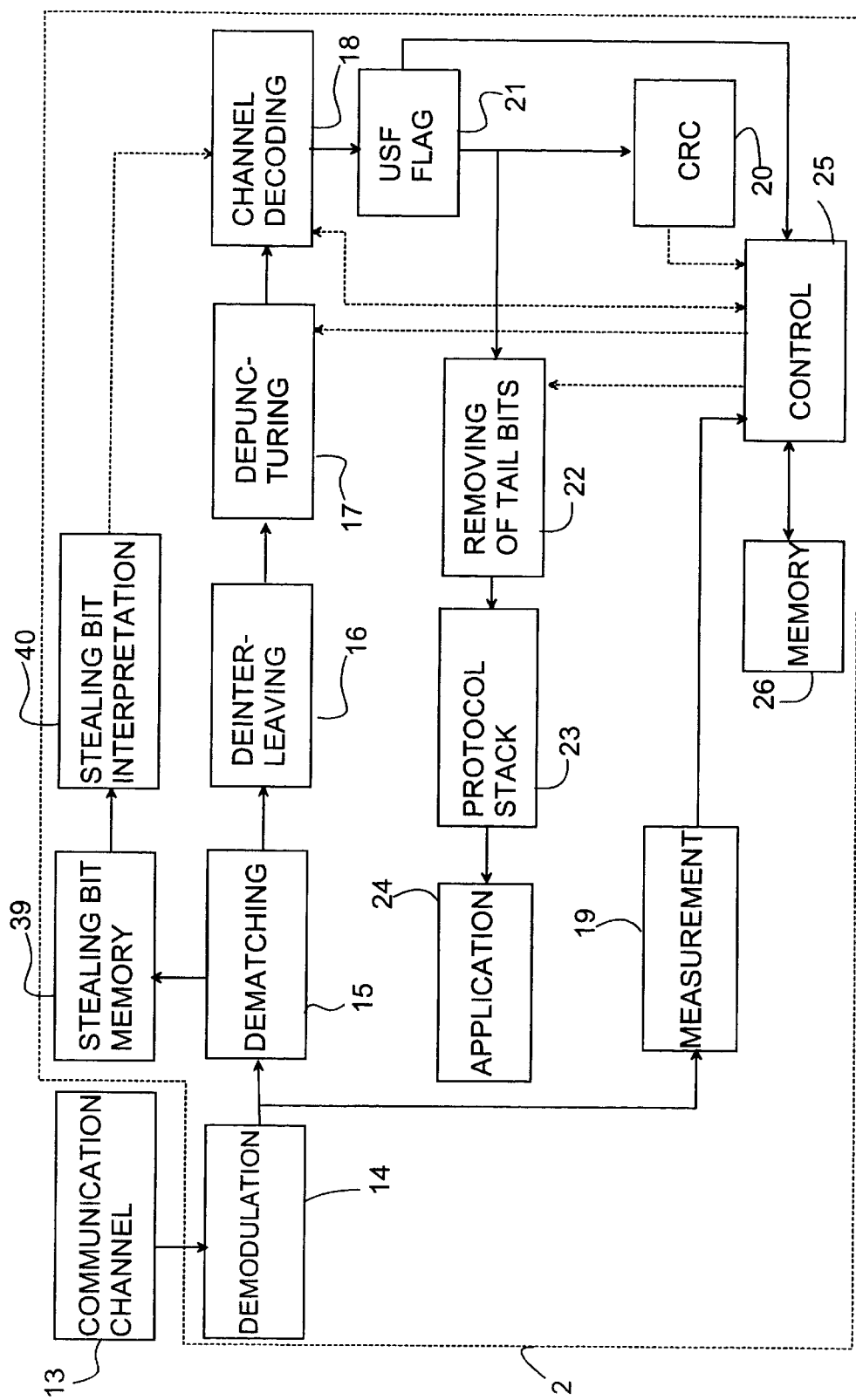
Figure 4:
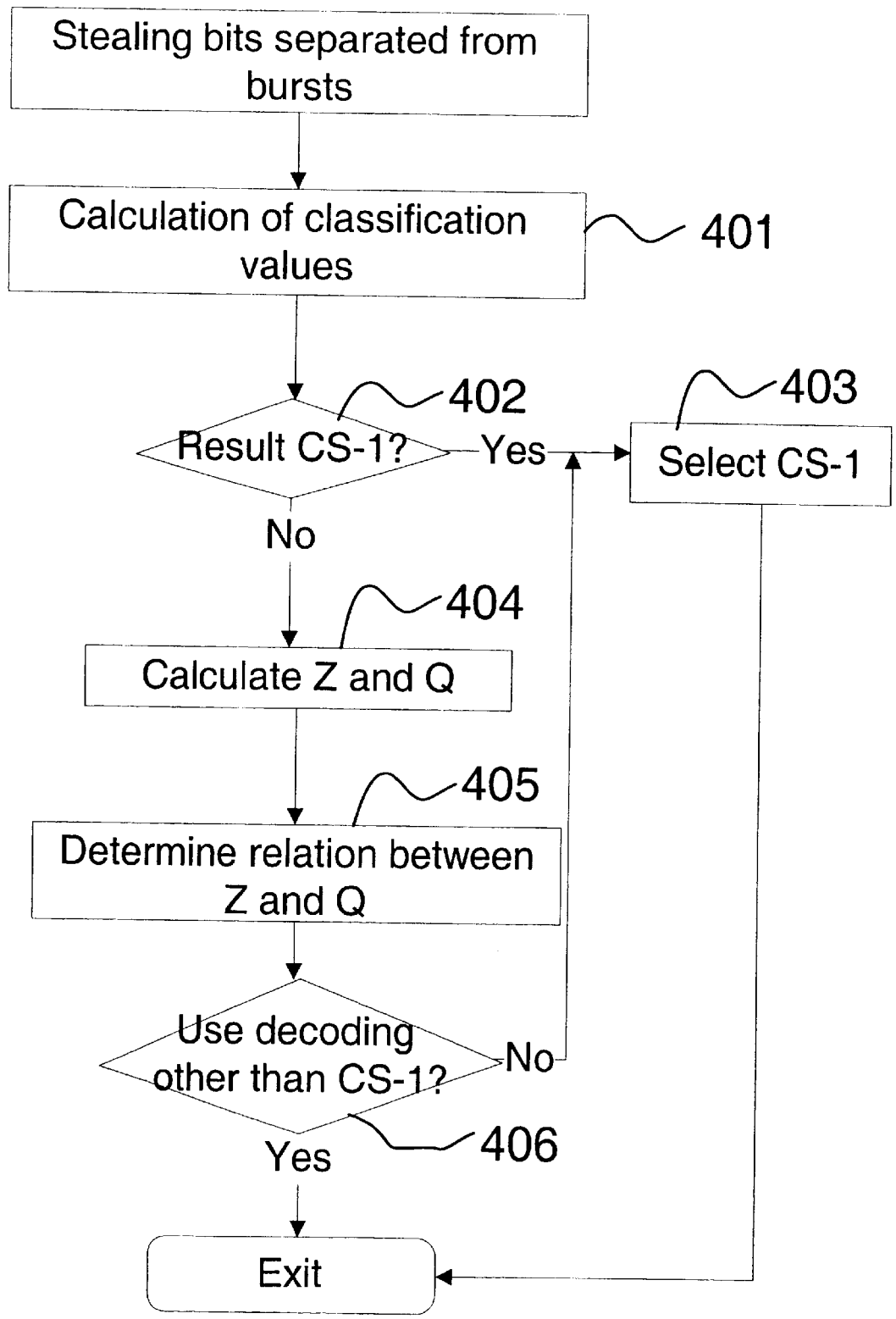
Figure 5:
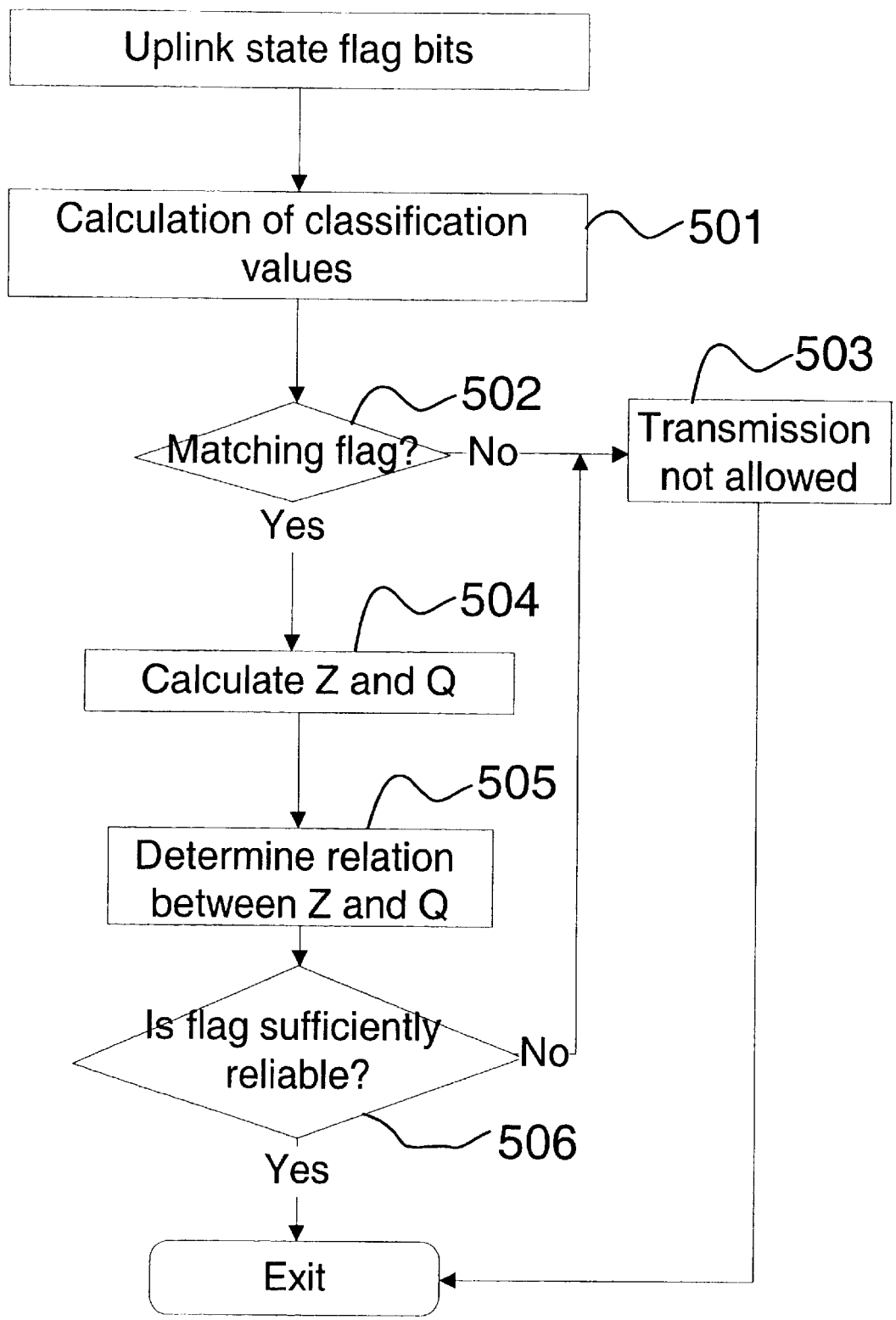
Figure 6:
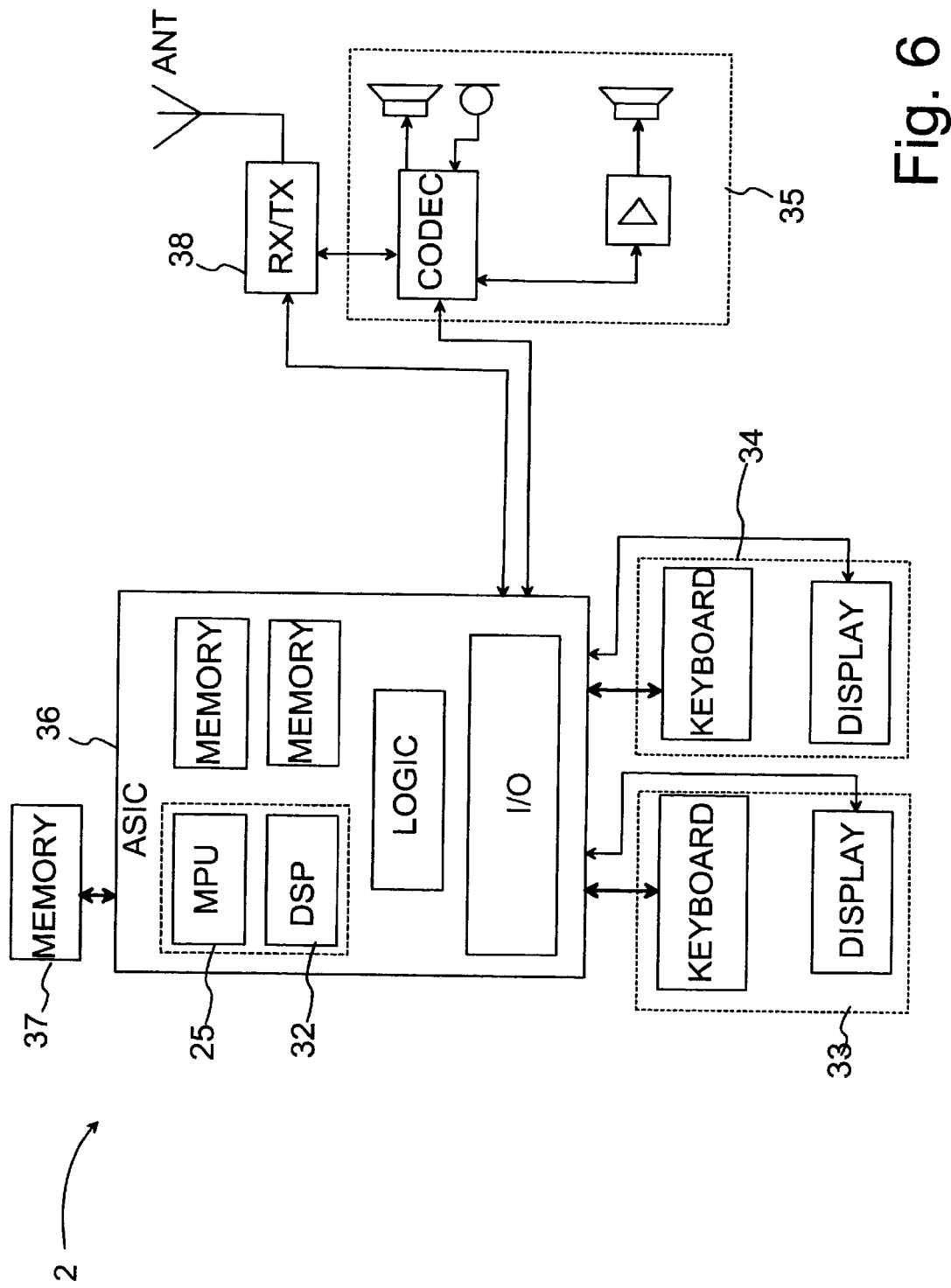
Figure 7:
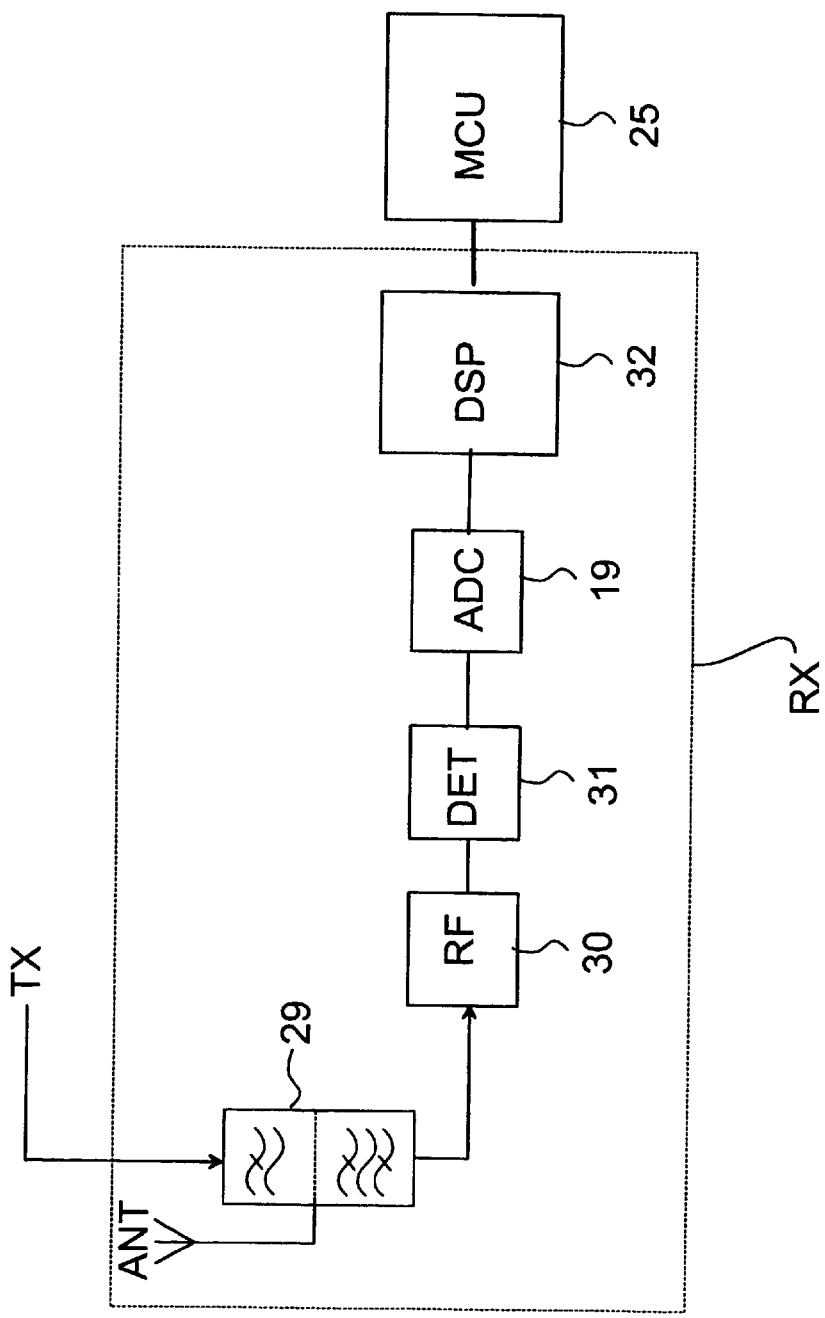

In the following, the invention will be described in more detail with reference to the appended drawings, in which FIG. 1 shows a GPRS system in a reduced chart, FIG. 2 shows the protocol stack structure of the GPRS system in a reduced manner, FIGS. 3a and 3b illustrate a reduced block chart showing the operation of the method according to an advantageous embodiment of the invention in a communication system, FIG. 4 illustrates a flow chart showing the method according to an advantageous embodiment of the invention to find out the channel encoding, FIG. 5 illustrates a flow chart showing the method according to an advantageous embodiment of the invention to find out the uplink state flag, FIG. 6 illustrates a reduced block chart showing a wireless terminal according to an advantageous embodiment of the invention, and FIG. 7 illustrates a reduced block chart showing a receiver RX which can be applied in a wireless terminal according to an advantageous embodiment of the invention.

In the following, the invention will be described by using the GPRS system as an example, but it is obvious that the invention can also be applied in other packet-switched communication systems. The bit patterns to be used in the description of the invention e.g. to indicate the channel encoding scheme and the uplink state flag, as well as the different frame structures, are only some advantageous examples, to which the example is, nevertheless, not restricted. FIGS. 3a and 3b illustrate, in a reduced block chart, the operation of a method according to an advantageous embodiment of the invention in a communication system 1 when information is transmitted via a base station subsystem BSS to a wireless terminal 2.

It is assumed that the user of the wireless terminal 2 has activated a packet data connection to the communication system 1, e.g. to retrieve information from a server computer 3 to the wireless terminal 2. Thus, resources are allocated for the connection preferably only when information is being transmitted. The user has started an application program in the wireless terminal 2, e.g. a WWW browser program, an e-mail program or a terminal program. At the stage when the connection has information to be transmitted to the wireless terminal 2, the information is converted to comply with a communication protocol, preferably in packet format, and transmitted to a mobile communication network 4. In the mobile communication network 4, the packets are transmitted via a GGSN support node and a SGSN support node to the base station subsystem BSS to which the respective wireless terminal 2 is coupled.

The packet received in the mobile communication network 4 is converted in the support node SGSN to one or more packets of radio communication of the L2 layer. On the other hand, it is possible to transmit LLC packets of even more than one connection in one packet of radio communication. The packets of radio communication are converted into bursts to be transmitted on the radio channel preferably in the following way. For the packet of radio communication, first a checksum, preferably a CRC (cyclic redundancy check) checksum is calculated in a checksum block 5, and the check data (parity data) is added into the packet. After this, the packet is conducted to a pre-coder 6, in which the packet is further supplemented with said uplink state flag. If necessary, the packet is further supplemented with tail bits in a tail block 7 to achieve a packet of a given length. If the selected channel encoding scheme is the first channel encoding scheme CS-1, the second channel encoding scheme CS-2 or the third channel encoding scheme CS-3, the packet is preferably also subjected to convolution coding in a channel encoder 8. The purpose of this convolution coding is e.g. to add error correction data to the data to be transmitted, wherein at the receiving stage it is possible to correct some of the errors in the transmission caused by the communication channel 13. After the convolution coding, the length of the bit string can be greater than the bit number that can be transmitted in four bursts. For example, it can be seen from table 1 that when the second channel encoding scheme CS-2 is used, the number of channel-coded bits is 588, and, correspondingly, when the third channel encoding scheme CS-3 is used, the number of channel-coded bits is 676. Thus, the puncturing of the bit string is performed in a puncturing block 9, in which some of the bits are removed (not transmitted).

At the transmission stage the bits formed of the packets and possibly encoded are not transferred as such into the bursts, but the bits are further subjected to interleaving and matching in blocks 10 and 11. By interleaving, the bits are divided into four bursts in such a way that the bits of one byte are not placed in the same burst but preferably in all the four bursts in a specific order. This interleaving order is known to the receiver, wherein it is possible to restore the order of the bits. The purpose of the matching is to place the interlaced bits in given locations in each burst in such a way that bits are left in the bursts for also other uses (stealing bits), such as the transmission of channel encoding data or other control data. These bits are called stealing bits in this specification.

After the matching, the bits are conducted to a modulator 12 to form bursts to be transmitted on a communication channel 13, which is known per se. A control means 27 in the base station controller takes care of e.g. timing of the transmission of the bursts, setting of the channel coder to a functional state corresponding to the selected coding method, and controlling the operation of the tail block 7 and the matching block 11.

In the wireless terminal 2, the receiver RX listens on the receiving channel which was given by the base station subsystem to the wireless terminal 2. In the wireless terminal 2, bursts are received, and the operations performed are inverse to those of the transmission stage. The bursts are demodulated in a demodulator 14, wherein a demodulated bit string is formed. In the next step, the matching of data bits is removed in a dematching block 15 in which the stealing bits are separated from the data bits. In a practical application, the stealing bits received in a burst must be stored in connection with each burst. After this, the stealing bits are stored in a stealing bit memory 39. The channel encoding scheme can be interpreted after all the bursts (4 bursts) used in the transmission of the stealing bits (8 bits) have been received. The removal of the interleaving is performed in an arrangement block 16, wherein there is a bit string in the output of the arrangement block 16 which in faultless reception corresponds to the encoded and possibly punctured bit string of the transmission stage.

If the bit string has been punctured at the transmission stage, the removed bits are added in the bit string before decoding in a bit restoring block 17. However, the correct value of the removed bits is not known in the receiver RX, but by means of error correction data added in the encoding, it is possible to try to restore the information corresponding to the original information in decoding. To obtain the best decoding result, the value of the removed bits should be set to 1/2, but also the values 0 and 1 can be used.

In a decoder block 18, the channel encoding scheme is used which is interpreted on the basis of the received stealing bits in an interpretation block 40.

In a wireless terminal 2 according to an advantageous embodiment of the present invention, the decoding method is detected preferably in the following way, with reference to the flow chart of FIG. 4. In the wireless terminal 2, the strength Rx of the received signal and the signal/noise ratio SNR are measured in a measuring block 19. These measurement values can be stored e.g. in memory means 26. The operation of the measuring block 19 according to an advantageous embodiment of the invention will be described below in this specification.

On the basis of the received channel encoding data, it is found out which code (bit pattern) of the channel encoding data is closest to the received channel encoding data (block 401). This can be performed e.g. by calculating the cross correlation of the received channel encoding data to each scheme separately, wherein a classification value is obtained for each scheme. On the basis of these classification values, it is possible to deduce the most probable channel encoding scheme (block 402). If the first channel encoding scheme CS-1 is obtained as the result, this is selected to be used in the channel decoding (block 403). In this embodiment, this first channel encoding scheme corresponds to a channel encoding scheme which is least susceptible to interference. However, if another channel encoding scheme is obtained as the result, preferably a first performance value Z and a second performance value Q are still calculated (block 404). The first performance value Z describes how close, on the basis of the calculated classification values, the most probable scheme is to the first channel encoding scheme CS-1. The first performance value Z is calculated e.g. by using one of the following formulas: $Z=(x-y)/y$, $Z=(x-y)/x$ or $Z=y/x$, in which x represents the classification value of the most probable scheme and y represents the classification value calculated for the first channel encoding scheme CS-1. The second performance value Q is calculated on the basis of the measured signal strength Rx and the signal/noise ratio SNR, weighted with a first weighting coefficient A and a second weighting coefficient B preferably in the following way: $Q=A \times Rx + B \times SNR$.

After the performance values Z and Q have been calculated, they are used to conclude whether the calculation of the classification value has been sufficiently reliable or whether the signal strength or the signal/noise ratio has been too small (block 405). To make the conclusion, the wireless terminal 2 contains e.g. a stored table in which the conditions for accepting the classification result are given for different values Z and Q. Another alternative is to calculate the product or sum of the performance values Z and Q and to define an acceptance condition for the same. It can be stated about the dependence between these performance values Z and Q in this preferred embodiment that the better the second performance value Q is, the worse can the first performance value Z be, the classification result being still acceptable for selecting the calculated channel encoding scheme.

After finding out the channel encoding scheme, decoding inverse to the channel encoding scheme is performed in the decoder 18. From the decoded bit string, a checksum is calculated in a checking block 20 in a way corresponding to the calculation of the checksum at the transmission stage, and the calculated checksum is compared with the received checksum. If the checksums match, the data was probably received correctly. In other cases, there was an error in the data transmission. The way of operation in an error situation depends e.g. on the quality of service determined for the connection and on the nature of information to be transmitted in the connection. In some cases, the received information is rejected and retransmission is requested; in some cases, the preceding faultlessly received information is used, which is known per se.

In the wireless terminal 2, the uplink state flag is also detected in block 21 from the bits of the received, decoded bit string preferably in the following way, with reference to the flow chart of FIG. 5. The wireless terminal 2 knows its own uplink state flag. On the basis of the received and decoded uplink state flag, it is examined which possible uplink state flag (bit pattern) is closest to the received uplink state flag (block 501). Here, the methods used can be similar to those used in the description of the channel encoding scheme above. The cross-correlation, Euclidean distance, Hamming distance, etc. for the received uplink state flag can be calculated for each alternative separately, wherein a classification value is obtained for each alternative. On the basis of these classification values, it is possible to deduce, which of the possible uplink state flags is the most probable (block 502). If the result obtained is not the same uplink state flag as the uplink state flag of the wireless terminal 2, it is deduced that the respective wireless terminal 2 is not allowed to transmit in the next set of bursts (block 503). However, if the most probable classification value is the uplink state flag of the respective wireless terminal 2, the next step is to calculate the performance values (block 504). These can be calculated on the same principle as presented in connection with the description of the channel encoding scheme. On the basis of the calculated performance values Z, Q, it is further deduced (blocks 505 and 506), whether the calculation of the uplink state flag has been sufficiently reliable, and the wireless terminal 2 can transmit in the next set of bursts.

The above-presented operations for finding out the channel encoding scheme and the uplink state flag can be primarily implemented in the wireless terminal 2 either in a processor 25 or in a digital signal processing unit 32, or in both.

By using the signal strength data Rx and the signal/noise ratio SNR in the above-described methods, it is possible to evaluate in a more reliable way whether the calculation results can be used in the selection of the decoding method and/or in the examination of the uplink state flag.

After the bit string has been decoded, the reconstructed radio communication frame can be wirelessly transmitted to upper layers of a protocol stack 23 in the terminal 2 in a way known per se, wherein the received information is available to an application 24.

FIG. 6 shows, in a reduced manner, a wireless terminal 2 according to an advantageous embodiment of the invention. The wireless terminal 2 preferably comprises mobile communication functions and data processing functions, for which the wireless station 2 can be equipped with separate user interfaces 33, 34. For arranging data transmission to the mobile communication network 4, the wireless station 2 comprises a high-frequency part 38 with e.g. a transmitter (not shown) and a receiver. Furthermore, the wireless station 2 is provided with audio means 35, such as an earpiece and a microphone. In the wireless station 2 of FIG. 6, a processor 25 and a digital signal processing unit 32 are implemented by means of an application specific integrated circuit ASIC. The ASIC circuit 36 also comprises other functions, such as a control logic (LOGIC), a memory (MEM) and an interface logic (I/O). The memory means 26 of the wireless terminal 2 can also comprise an external memory 37.

FIG. 7 shows, in a reduced manner, a receiver RX which can be used e.g. in the wireless terminal 2 of FIG. 6. In the receiver RX, signals are received with an antenna ANT and conducted via an antenna switch 29 to a receiver pre-stage 30, in which the received signal is subjected to e.g. bandpass filtering and conversion either as a direct conversion or via one or several intermediate frequencies to a baseband signal. This conversion is performed in a way known per se by mixing the received signal with one or several local oscillator frequencies. For the sake of clarity, local oscillators are not marked in the appended drawings, and they are prior art known to anyone skilled in the art.

From the receiver pre-stage 30, the received signal is conducted to be demodulated in a demodulator 31. The demodulator 31 generates an analog signal which is converted to a digital signal in an analog/digital converter ADC. After this, the digital-format signal is led to a digital signal processing unit 32.

The digital signal processing unit 32 is used for performing signal processing operations on demodulated signals, for the purpose of e.g. attenuating noise and disturbances in the received, demodulated signal. In the digital signal processing unit 32, it is possible to implement several signal processing algorithms by programming the program commands corresponding to these functions in the application software. Thus, several types of filters can be produced, also such filters that are not possible or reasonable to implement with analog techniques.

Furthermore, the digital signal processing unit 32 can be used to calculate the strength of the received signal from the demodulated signal formed by the demodulator 31. To measure the signal/noise ratio, in addition to measuring the strength Rx of the received signal, preferably also the strength of noise and other spurious signals is measured, wherein the signal/noise ratio SNR is obtained as the ratio of these measurement values. The noise strength can be measured e.g. in an idle time slot, preferably in an idle time slot preceding a receiving time slot. Thus, the processor MCU of the wireless terminal indicates to the digital signal processing unit 32 that the received signal is not a useful signal but a spurious signal. Consequently, the digital signal processing unit 32 calculates on the basis of the signal formed by the demodulator 31 the noise strength, wherein also the signal/noise ratio SNR can be calculated. It is obvious that said received signal strength Rx and signal/noise ratio SNR can also be determined by other methods, known as such, than the methods mentioned here.

The invention can also be applied in such a way that no classification values are used in the determination of the first performance value Z but the first performance value Z is selected to be a limit value suitable for the respective application. In this case, the second performance value Q is calculated in the same way as above, and it is examined if the second performance value is greater than the second performance value Z. Consequently, in this alternative it is not examined how close the classification values calculated for the different alternatives are to the classification value calculated for a default value, but the reliability evaluation is performed solely on the basis of the signal strength and the signal/noise ratio.

In practical applications, the above-presented arrangement block 17, decoder 18, measuring block 19 and checking block 20 of the receiver RX can also be implemented at least partly by software, preferably as program commands in the digital signal processing unit 32.

Moreover, the communication system 1 according to the invention can be implemented by applying the method of the invention only either to find out the channel encoding or to find out the uplink state flag.

It is obvious that the present invention is not limited solely to the embodiments presented above, but it can be modified within the scope of the appended claims.

What is claimed is:

1. A method for transmitting control information in a communication system (1) comprising at least one base station subsystem (BSS) and a wireless terminal (2), in which method a set of alternative values are defined for said control information, information is transmitted in packet form between the base station subsystem (BSS) and the wireless terminal (2), the packets to be transmitted on a communication channel are transformed into bursts, and at least one burst formed of a packet is supplemented with at least one item of control data, wherein at the receiving state, the control data received in the burst is examined, characterized in that the method also comprises the step of examining at least one property of the received signal to find out the reliability of the received control data.

2. The method according to claim 1, characterized in that to examine the properties of the received signals, the strength (Rx) of the received signal is measured.

3. The method according to claim 1, characterized in that to examine the properties of the received signals, the signal/noise ratio (SNR) of the received signal is also measured.

4. The method according to claim 3, characterized in that to find out the alternative selected for the transmitted control data, a classification value is determined on the basis of the received control data for each alternative defined for the control data; one of said alternatives is selected as a default value; a first performance value (Z) is determined on the basis of the classification value determined for said default value and said other classification values; a second performance value (Q) is determined on the basis of the signal strength and the signal/noise ratio; an acceptance condition is determined as a relation between said first performance value (Z) and second performance value (Q), wherein if on the basis of the classification values the most probable alternative is other than the default value, this alternative is selected, if the acceptance condition is realized; in other cases, said default value is selected.

5. The method according to claim 4, characterized in that the first performance value (Z) is determined by one of the following formulas:

$$Z=(x-y)/y,$$

$$Z=(x-y)/x,$$

or $$Z=y/x,$$

in which x represents the classification value of the most probable alternative and y represents the classification value calculated for a first channel encoding scheme (CS-1), and that a first weighting coefficient (A) and a second weighting coefficient (B) are selected, wherein the second performance value (Q) is determined by the formula:

$$Q=A \times Rx + B \times SNR.$$

6. The method according to claim 1, characterized in that at least a first channel encoding scheme (CS-1) and a second channel encoding scheme (CS-2) are determined, wherein at least some of the information to be transmitted is encoded by one of said channel encoding schemes (CS-1, CS-2), and that said control data is supplemented with information on the channel encoding scheme (CS-1, CS-2) used in the transmission, wherein at the receiving stage the received channel encoding data is examined to select the channel encoding scheme corresponding to the channel encoding.

7. The method according to claim 1, characterized in that for performing data transmission, transmission time slots are defined for the transmission of bursts from the base station subsystem (BSS) to wireless terminals (2) and receiving time slots for the transmission of bursts from wireless terminals (2) to the base station subsystem (BSS); a set of uplink state flags are defined, from which one is allocated for the wireless station (2); one or more of receiving time slots are selected, in which information is transmitted from the wireless terminal (2) to the base station subsystem (BSS) and information on the receiving time slot selected for the wireless station (2) is transmitted by supplementing the control data with the uplink state flag of the respective wireless terminal (2) and transmitting it from the base station subsystem (BSS) in any transmission time slot preceding said receiving time slot.

8. The method of claim 1 further comprising, prior to transmitting the information to the wireless terminal, selecting a coding method for the information, and determining a decoding method from the received signal.

9. The method of claim 1 further comprising examining at least one property of the received signal to determine a decoding method of the received signal.

10. A communication system (1) comprising at least one base station subsystem (BSS) and a wireless terminal (2), means (6, 11, 15, 21) for transmitting control data between the base station subsystem (BSS) and the wireless terminal (2), means (7–18) for transmitting information in packet form between the base station subsystem (BSS) and the wireless terminal (2), means (10, 11, 12) for converting packets to be transmitted on a communication channel into bursts, and means (6, 11) for adding at least one item of control data in at least one burst formed of a packet, wherein at the receiving stage the control data received in the burst is arranged to be examined, and in which communication system (1) a set of alternative values is defined for said control data, characterized in that the communication system (1) also comprises means (19, 25) for examining at least one property of the received signal to find out the reliability of the received control data.

11. The communication system (1) according to claim 10, characterized in that the means (19, 25) for examining at least one property of the received signal comprise means (16) for measuring the strength (Rx) of the received signal.

12. The communication system (1) according to claim 10, characterized in that the means (19, 25) for examining at least one property of the received signal comprise means (16, 25) for measuring the signal/noise ratio (SNR) of the received signal.

13. The wireless terminal of claim 10 further comprising means for choosing a coding method prior to transmitting the burst to the wireless terminal and wherein a decoding method for decoding the burst is determined from the received signal.

14. A wireless terminal (2) to be used in a communication system (1) comprising at least one base station subsystem (BSS) and a wireless terminal (2), means (6, 11, 15, 21) for transmitting control data between the base station subsystem (BSS) and the wireless terminal (2), means (7–18) for transmitting information in packet form between the base station subsystem (BSS) and the wireless terminal (2), means (10, 11, 12) for converting packets to be transmitted on a communication channel into bursts, and means (6, 11) for adding at least one item of control data in at least one burst formed of a packet, and in which communication system (1) a set of alternative values is defined for said control data, wherein the wireless terminal (2) comprises means (21, 25, 40) for examining the control data received in the burst, characterized in that the wireless terminal (2) also comprises means (19, 25) for examining at least one property of the received signal to find out the reliability of the received control data.

15. A base station subsystem (BSS) to be used in a communication system (1) comprising at least one wireless terminal (2), means (6, 11, 15, 21) for transmitting control data between the base station subsystem (BSS) and the wireless terminal (2), means (7–18) for transmitting information in packet form between the base station subsystem (BSS) and the wireless terminal (2), means (10, 11, 12) for converting packets to be transmitted on a communication channel into bursts, and means (6, 11) for adding at least one item of control data in at least one burst formed of a packet, and in which communication system (1) a set of alternative values is defined for said control data, wherein the base station subsystem (BSS) comprises means (21, 25, 40) for examining the control data received in the burst, characterized in that the base station subsystem (BSS) also comprises means (19, 25) for examining at least one property of the received signal to find out the reliability of the received control data.

* * * * *